United States Patent [19]
Orsini, Jr.

[11] Patent Number: 5,428,894
[45] Date of Patent: Jul. 4, 1995

[54] METHOD OF MAKING A CAMSHAFT

[75] Inventor: Louis V. Orsini, Jr., Kensington, Conn.

[73] Assignee: The Torrington Company, Torrington, Conn.

[21] Appl. No.: 180,743

[22] Filed: Jan. 12, 1994

Related U.S. Application Data

[63] Continuation-in-part of Ser. No. 912,432, Jul. 13, 1992, Pat. No. 5,280,675.

[51] Int. Cl.⁶ .............................................. B23P 15/00
[52] U.S. Cl. .................................. 29/888.1; 29/523; 74/567
[58] Field of Search ................ 29/888.1, 523, 522.1, 29/505; 74/567

[56] References Cited

U.S. PATENT DOCUMENTS

| | | | |
|---|---|---|---|
| 1,945,092 | 1/1934 | Storer | 29/153 |
| 4,294,100 | 10/1981 | Olschewski et al. | 72/340 |
| 4,597,365 | 7/1986 | Madaffer | 29/888.1 |
| 4,612,695 | 9/1986 | Umeha et al. | 29/505 |
| 4,693,138 | 9/1987 | Hughes et al. | 74/567 |
| 4,781,076 | 11/1988 | Hartnett et al. | 74/567 |
| 4,809,562 | 3/1989 | Bendoraitas et al. | 74/567 |
| 4,847,963 | 7/1989 | Bendoraitas et al. | 29/523 |
| 4,858,925 | 8/1989 | Hartnett et al. | 29/156.4 R |
| 4,903,543 | 2/1990 | Matt | 74/567 |
| 4,947,547 | 8/1990 | Matt | 29/888.1 |
| 5,052,845 | 10/1991 | Maus et al. | 29/888.1 |
| 5,157,832 | 10/1992 | Hughes | 29/888.1 |
| 5,197,351 | 3/1993 | Hishida | 29/888.1 |
| 5,205,187 | 4/1993 | Ebbinghaus | 29/888.1 |
| 5,259,268 | 11/1993 | Ebbinghaus et al. | 74/567 |
| 5,280,675 | 1/1994 | Orsini, Jr. | 29/888.1 |

FOREIGN PATENT DOCUMENTS

| | | |
|---|---|---|
| 0324499 | 7/1989 | European Pat. Off. |
| 3521206A1 | 12/1986 | Germany |
| 3941718 | 6/1991 | Germany ............... 29/888.1 |
| 0189830 | 8/1986 | Japan ..................... 29/888.1 |
| 0267029 | 11/1987 | Japan ..................... 29/888.1 |

*Primary Examiner*—Irene Cuda
*Attorney, Agent, or Firm*—Michael H. Minns

[57] ABSTRACT

A method of manufacturing a camshaft wherein the camshaft has a plurality of first zones having a plurality of circumferentially spaced thicker wall segments and a plurality of thin wall sections. Axially spaced cams are mounted on a hollow tube about the zones. The thicker wall segments are deformed outward to mechanically secure the cams to the hollow tube. The outer diameter of the hollow tube thin wall sections are not deformed when the thicker wall segments are deformed.

8 Claims, 3 Drawing Sheets

5,428,894

METHOD OF MAKING A CAMSHAFT

This is a continuation-in-part of application Ser. No. 07/912,432, filed Jul. 13, 1992, now U.S. Pat. No. 5,280,675.

BACKGROUND OF THE INVENTION

This invention relates generally to camshafts for reciprocating piston engines and more particularly to camshafts and a method of making a camshaft where the cams and shaft are produced as individual elements and are fastened together forming the camshaft.

One method of manufacturing camshafts involves forming the cams separately by methods such as powdered metallurgy. The cams are then fastened to a hollow tube using known fastening processes, such as welding, brazing or expansion of the hollow tube. Bearing or journal surfaces are machined onto the hollow tube between cams. Another method of attaching the cams, described in U.S. Pat. No. 4,858,295, leaves a plurality of projections on the outside of the hollow tube between cams. These projections must be removed in order to form the journal surfaces.

The displacement of material caused by an expander tool during expansion of the hollow tube induces work hardening and stress into the tube. Limiting work hardening reduces the risk of failure due to tube splitting.

The foregoing illustrates limitations known to exist in present camshafts. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a camshaft comprising: a rotatable tube having a plurality of axially spaced apart first portions and a plurality of axially spaced apart second portions, a first portion being adjacent to a second portion, each first portion having a plurality of circumferentially spaced apart segments, the tube wall thickness of each segment being thicker than the tube wall thickness of an adjacent second portion; and a plurality of axially spaced cams mounted about the rotatable tube, each cam having an axial opening and being positioned about a first portion.

In a second aspect of the present invention, this is accomplished by providing a method of making a camshaft comprising the steps of: providing a hollow tube; roll forming a plurality of axially spaced apart first zones on the hollow tube, each first zone having a plurality of circumferentially spaced apart reduced diameter segments; providing a plurality of cam elements, each cam element including an axial opening; inserting the hollow tube into the cam elements, each cam element being positioned about a first zone; and expanding the reduced diameter segments of the hollow tube into mechanical interference engagement with the cam elements.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
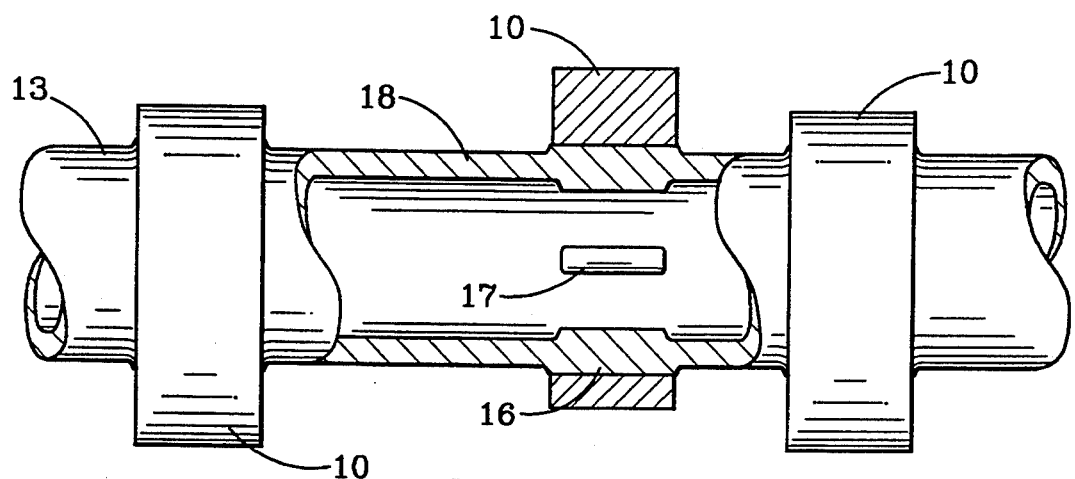
FIG. 1 is a cross section in part of the first embodiment of the camshaft of the present invention.

Referring to the drawings and more particularly to FIG. 1, the manufacture of the camshaft is accomplished by slipping the cams 10 over a hollow tube 13. Other elements (shown as 12 in FIG. 7) in addition to cams 10, may be attached to the hollow tube 13 using this method. This includes timing gears, thrust washers, bearing rings, etc. The hollow tube 13 has a plurality of areas 16 which have segments 17 of thicker wall thickness than the adjacent areas 18. Because of the thicker wall segments or reduced diameter segments) 17, areas 16 have an effective reduced inner diameter compared to the thinner wall areas 18. The cams 10 are positioned about the reduced diameter areas 16. Some of the thinner wall areas 18 are used as bearing or journal surfaces.

The hollow tube 13 is preferably made of formable steel having a maximum hardness of $R_c30$. The cams 10 are preferably made of steel which is hardenable to a minimum hardness of $R_c55$. Powder forged AISI 4680 series material has also been successfully used as cams 10.

Figure 2:
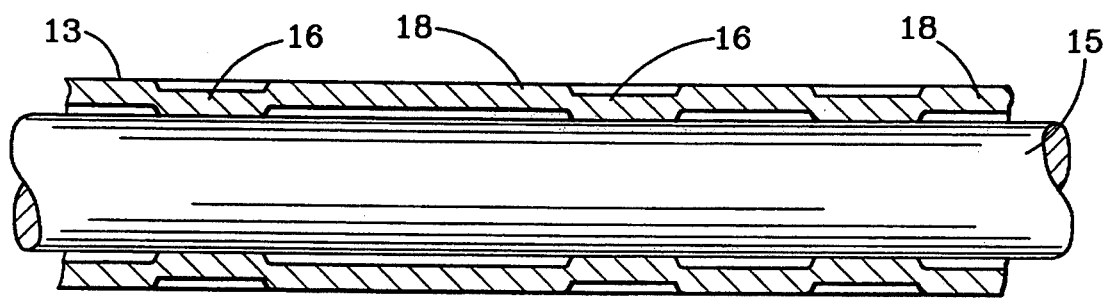
FIG. 2 is a cross section of the hollow tube after the initial forming step.
Figure 9:
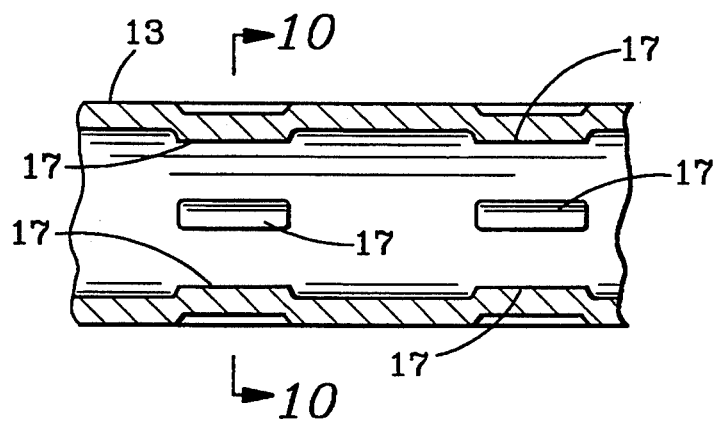
FIG. 9 is another view of a cross section of the hollow tube after the initial forming step.
Figure 10:
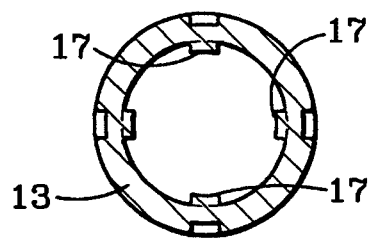
FIG. 10 is a cross section view taken along line 10—10 of FIG. 9.

The reduced diameter areas 16 and the thinner areas 18 are formed by pressing specific circumferentially separated segments 17, as shown in FIGS. 9 and 10, of the hollow tube 13 to reduce the outer diameter of segments 17, and then machining the hollow tube 13 to a uniform outer diameter. FIG. 2 shows the hollow tube 13 after this pressing has been performed. The preferred method is to roll form segments 17 around the outer diameter of the hollow tube 13. These reduced diameter segments or pockets 17 would be generated at specified circumferential locations around the hollow tube 13 outer diameter. This process would result essentially in an internal spline effect (see FIG. 10) at specified axial locations corresponding to the individual cam elements 10. Also shown in FIG. 2 is an internal mandrel 15 which is used to support the inside diameter of the segments 17 when the hollow tube 13 is rolled. The use of internal mandrel 15 is optional. By providing inside support, the final diameter of segments 17 can be better controlled.

By limiting the amount of material flow to that required to roll form the segments 17, the material deformation and induced stress in the hollow tube 13 is significantly reduced.

The preferred axial length for the reduced diameter areas 16 is slightly less than the axial length of a cam 10. This should minimize or preclude any change in the outer diameter of the thinner areas 18 when the cams 10 are fastened to the hollow tube 13.

Figure 3:
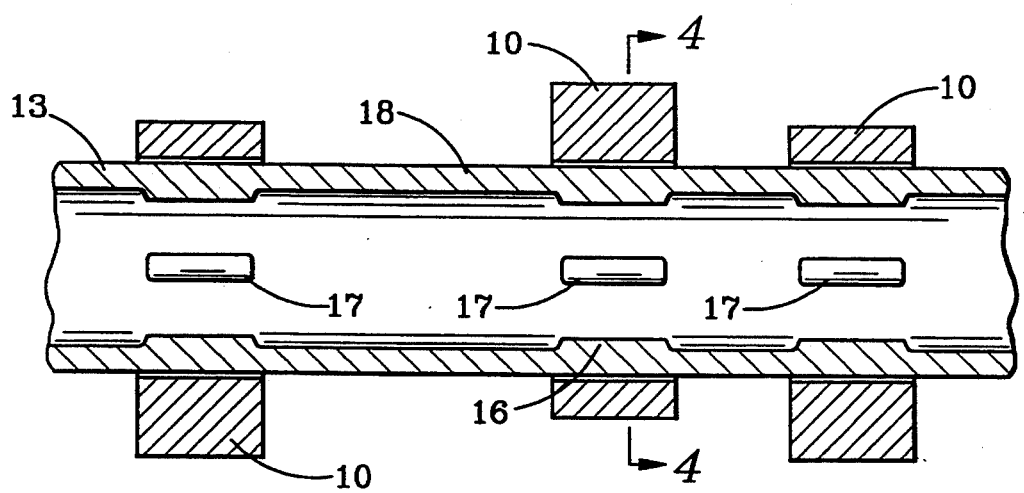
FIG. 3 is a cross section of the hollow tube shown in FIG. 2 after the outer diameter is machined, showing the cams located about the tube.

After the rolling step is performed, the outside diameter of the hollow tube 13 is machined to a uniform outer diameter. The outside of the hollow tube 13 can be finish ground at this time to produce a final surface which acceptable as a bearing or journal surface. Typically, the hollow tube 13 is machined using center-less grinding. Other processes, such as turning, may be used. After this machining step, the hollow tube 13 will have a plurality of reduced diameter areas 16 and a plurality of thinner wall areas 18. For typical automobile camshafts, the preferred thicker wall area thickness for segments 17 is 0.155 inches and the preferred thinner wall thickness 18 is 0.128 inches. FIG. 3 shows the hollow tube 13 after the tube has been machined to produce a uniform outer diameter. The difference between the wall thickness of the two areas 17, 18 has been exaggerated for clarity.

Figure 4:
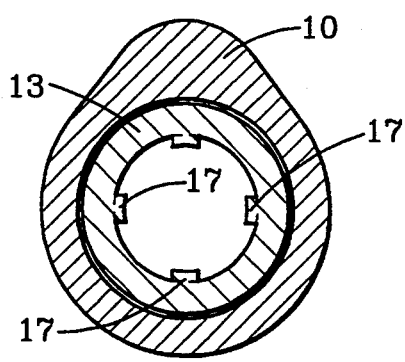
FIG. 4 is a cross section view taken along line 4—4 of FIG. 3.

The cams 10 are then assembled on the hollow tube 13 as shown in FIG. 3. Each cam 10 is aligned with a reduced diameter area 16. The axial opening of the cam 10 is slightly larger than the outer diameter of the hollow tube, creating a slight gap between the cam 10 and the tube 13 as shown in FIGS. 3 and 4.

Figure 5:
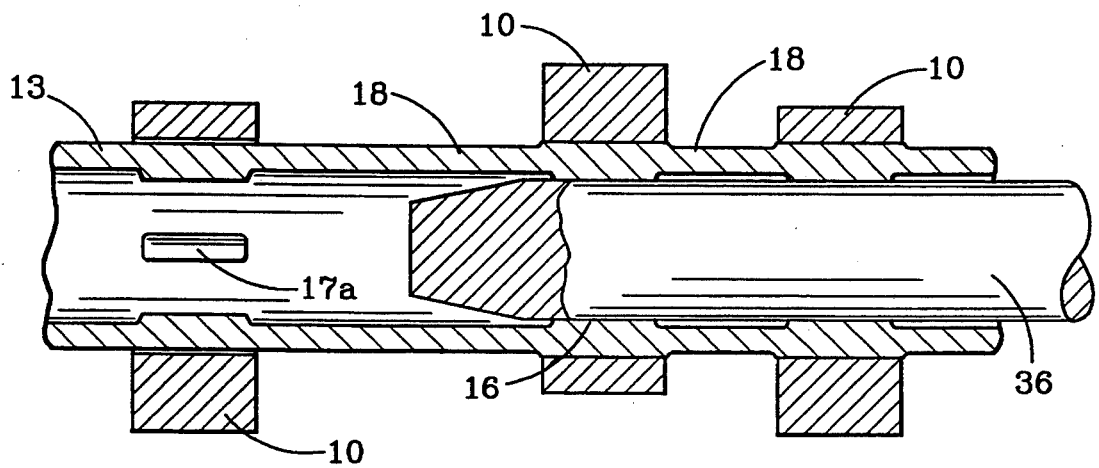
FIG. 5 is a cross section of the camshaft showing the cams after an expander tool has moved partially through the hollow tube.

The cams 10 are held in the proper angular alignment while an expander tool 36 is inserted into the hollow tube 13. FIG. 5 shows the expander tool 36 after it has been inserted past two cams 10. The outer diameter of the expander tool 36 is larger than the inner diameter of the reduced diameter areas 16 (i.e., segments 17). The outer diameter of the expander tool 36 is also smaller than the inner diameter of the thinner wall areas 18. As the expander tool 36 is inserted into the hollow tube 13, the segments 17 of reduced diameter areas 16 are expanded outward into contact with the axial opening of the cam 10. This expansion locks the cams 10 and the hollow tube 13 into mechanical interference engagement, thereby providing axial retention of the cams 10. Since the outer diameter of the expander tool 36 is smaller than the inner diameter of the thinner wall areas 18, these areas are not expanded during the insertion of the expander tool 36. Therefor, these areas 18 typically do not require any additional post assembly machining.

For applications with a variety of elements on the camshaft, cams, timing gears, etc., the degree of expansion needed to secure the element to the camshaft may differ for the different elements. To provide for differing degrees of expansion, the wall thickness of the segments 17 can differ. To achieve differing wall thickness, the amount of reduction during the rolling operation can be varied along with the amount of machining after rolling operation.

Figure 6:
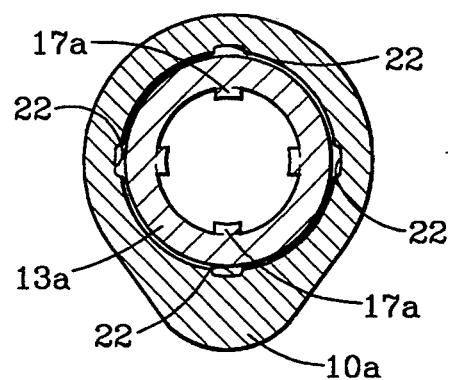
FIG. 6 is a cross section of a cam and hollow tube of a second embodiment of the present invention.
Figure 7:
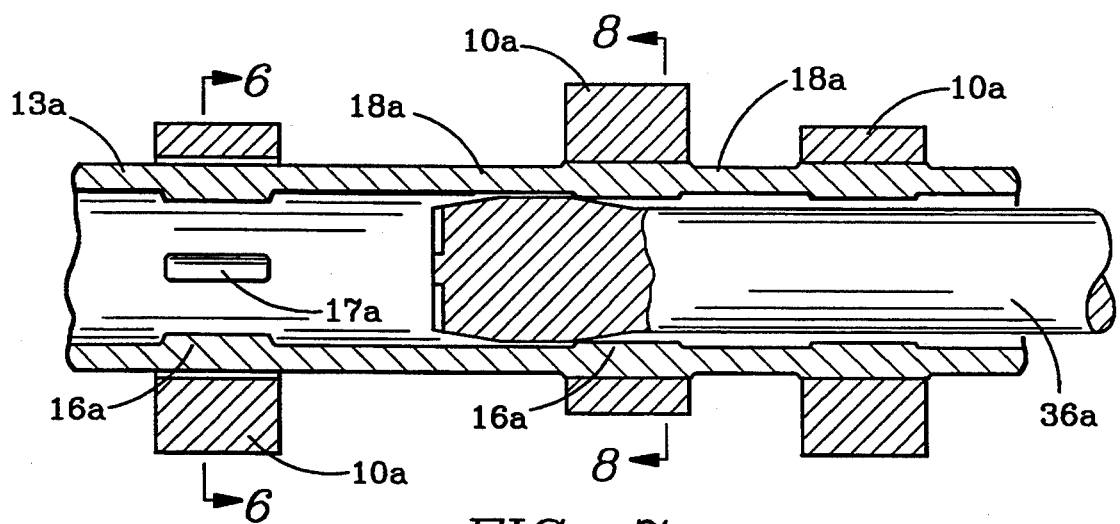
FIG. 7 is a cross section of the camshaft of the second embodiment showing the cams after an expander tool has moved partially through the hollow tube.
Figure 8:
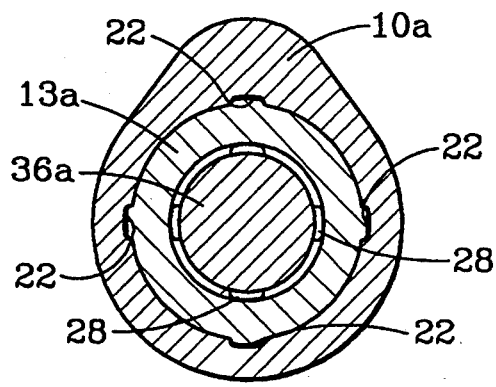
FIG. 8 is a cross section view taken along line 8—8 of FIG. 7.

FIGS. 6 through 8 show a second embodiment of the present invention. Each cam 10a is provided with a plurality of grooves 22 circumferentially spaced about the surface of the axial opening of the cam 10a. The hollow tube 13a is prepared as discussed above to form a plurality of reduced diameter areas 16a and thinner wall areas 18a. Each reduced diameter area 16a has a plurality of radial spaced thicker wall segments 17a.

After the cams 10a are assembled on the hollow tube 13a, an expander tool 36a is inserted into the hollow tube 13a. The expander tool 36 has a plurality of circumferentially separated hard material protrusions 28 adjacent one end of the expander tool 36a. The effective diameter of the protrusions 28 is sufficiently larger than the inside diameter of the thicker wall segments 17a of the hollow tube 13a to cause the protrusions 28 to expand portions of the thicker wall segments 17a into the cam grooves 22 to permanently secure the cams to the hollow tube 13a. The effective diameter of the protrusions 28 is sufficiently smaller than the inside diameter of the thinner wall areas 18a of the hollow tube 13a so that the thinner wall areas 18a are not expanded by the expander tool 36a.

As shown in FIG. 8, the hard material protrusions 28 are positioned so that as the protrusions 28 move within the tube past the cams 10, the hard material protrusions 28 will expand the softer tube material, specifically segments 17a, into the grooves 22.

Any additional elements 12 attached to the hollow tube 13a, such as timing gears, can be attached without grooves 22 on the surface of the axial opening.

Generally, eight cam grooves 22 are provided for an eight cylinder engine, six cam grooves 22 for a 6 cylinder engine and four cam grooves 22 for a four cylinder engine. Preferably, the number of circumferentially spaced thicker wall segments 17a is the same as the number of cam grooves 22. The thicker wall segments 17a, cam grooves 22 and protrusions 28 are circumferentially aligned as shown in FIG. 8.

Having described the invention, what is claimed is:

1. A method of making a camshaft comprising the steps of:
   providing a hollow tube;
   roll forming a plurality of axially spaced apart first zones on the hollow tube, each first zone having a plurality of circumferentially spaced apart reduced diameter segments;
   providing a plurality of cam elements, each cam element including an axial opening;
   inserting the hollow tube into the cam elements, each cam element being positioned about a first zone; and
   expanding the reduced diameter segments of the hollow tube into mechanical interference engagement with the cam elements.

2. The method of claim 1 wherein the areas of the hollow tube adjacent the first zones define larger diameter zones and the larger diameter zones do not expand during the step of expanding the reduced diameter zones.

3. The method of claim 1 further comprising:
   inserting a mandrel into the hollow tube prior to the step of forming a plurality of first zones, the mandrel remaining within the hollow tube during the step of roll forming a plurality of first zones.

4. The method of claim 1, further comprising:
   prior to inserting the hollow tube into the cam elements, machining the hollow tube to a uniform outer diameter, the reduced diameter segments thereby forming thicker wall segments.

5. A method of making a camshaft comprising the steps of:
   providing a hollow tube;
   inserting a mandrel into the hollow tube;
   roll forming a plurality of first zones on the hollow tube, each first zone having a plurality of circumferentially spaced apart reduced diameter segments;

removing the mandrel from within the hollow tube;

machining the hollow tube to a uniform outer diameter, the first zones forming circumferentially interrupted thicker wall zones, the areas of the hollow tube adjacent the circumferentially interrupted thicker wall zones defining thinner wall zones;

providing a plurality of cam elements, each cam element including an axial opening;

inserting the hollow tube into the cam elements, each cam element being positioned about a circumferentially interrupted thicker wall zone;

providing an expander tool having a diameter larger than the effective inner diameter of the circumferentially interrupted thicker wall zones and smaller than the inner diameter of the thinner wall zones;

expanding the reduced diameter segments of the hollow tube into mechanical interference engagement with the cam elements by inserting the expander tool into the hollow tube.

6. A method of making a camshaft comprising the steps of:

providing a hollow tube;

inserting a mandrel into the hollow tube;

forming a plurality of axially extending circumferentially spaced apart reduced diameter segments, the reduced diameter segments being positioned in a plurality of axially spaced cam zones on the hollow tube;

removing the mandrel from within the hollow tube;

machining the hollow tube to a uniform outer diameter, the reduced diameter segments forming thicker wall segments;

providing a plurality of cam elements, each cam element including an axial opening, the surface of the axial opening having a plurality of circumferentially spaced apart axially extending grooves;

inserting the hollow tube into the cam elements, each cam element being positioned about a cam zone;

expanding the reduced diameter segments of the hollow tube into mechanical interference engagement with the grooves.

7. The method of claim 6 wherein the step of expanding the reduced diameter segments includes inserting an expander tool having circumferentially separated hard material protrusions, the protrusions being positioned in radial alignment with the grooves so that as the protrusions move within the tube past the cam elements, the hard material protrusions expand the reduced diameter segments into the grooves.

8. The method of claim 7 wherein the areas of the hollow tube adjacent the cam zones define thinner wall zones and the thinner wall zones do not expand during the step of expanding the reduced diameter segments.

* * * * *